United States Patent [19]

Hagemeister

[11] Patent Number: 4,595,181
[45] Date of Patent: Jun. 17, 1986

[54] BENT WIRE SPRING UNIT

[75] Inventor: Robert C. Hagemeister, Boston, Mass.

[73] Assignee: Webster Spring Co. Inc., Oxford, Mass.

[21] Appl. No.: 632,047

[22] Filed: Jul. 18, 1984

[51] Int. Cl.⁴ ............................................. F16F 3/02
[52] U.S. Cl. ......................................... 267/103; 5/247
[58] Field of Search ................... 5/247, 255, 260, 265, 5/268, 274–277; 267/102, 103, 106, 107, 110, 111, 165

[56] References Cited

U.S. PATENT DOCUMENTS

| | | | |
|---|---|---|---|
| 3,722,013 | 3/1973 | Surletta | 5/247 |
| 4,398,705 | 8/1983 | Mizelle | 267/103 X |
| 4,470,584 | 9/1984 | Mizelle | 267/103 |
| 4,475,724 | 10/1984 | Hancock | 267/106 X |
| 4,510,635 | 4/1985 | Woffendin | 267/103 X |

Primary Examiner—Duane A. Reger
Attorney, Agent, or Firm—Robert T. Gammons

[57] ABSTRACT

Bent wire spring units for use in combination with a rectangular base frame embodying longitudinally-spaced, parallel, transverse support bars and a grid frame embodying a rectangular border wire and longitudinally and transversely-extending grid wires connected at their ends to the border wire and to each other at their crossings, each bent wire spring unit comprising upper and lower attaching elements connected to each other by integral lengths of wire resistant to bending and torsion. The bent wire spring units are transversely symmetrical from side to side and asymmetrical from front to back and are positioned transversely and longitudinally of the base frame and grid frame with their front sides on adjacent support bars facing and with their lower and upper ends attached, respectively, to the support bars of the base frame and the transverse wires of the grid frame. If there are an odd number of support bars, the spring units are alternately positioned in oppositely-facing directions. At the corners, the spring units are positioned with their front sides facing inwardly.

12 Claims, 17 Drawing Figures

BENT WIRE SPRING UNIT

BACKGROUND OF THE INVENTION

A variety of bent wire spring units have been developed to replace coil springs which have been conventionally employed to support and connect a grid frame to a rigid base frame such as a box spring assembly commonly used for supporting mattressess. Such bent wire spring units are shown in U.S. Pat. No. 4,218,790 and the patents cited therein and are generally comprised of a single or multiple lengths of wire bent at various angles to provide for resistance to displacement both by resistance to deflection, that is, bending, and torsion of the wires of which they are comprised. Each of the several patented structures is alleged to provide certain advantages in manufacture, assembly, construction and performance over any others. The spring units of the instant invention are generally of the aforesaid kind and are considered to constitute an improvement of such prior structures in that they are sturdier, less liable to be permanently deformed by excessive loads, more readily attachable to the base and grid frame and are adaptable to provide support at the corners as well as along the sides and ends and intermediate the sides and ends. The bent wire springs as herein disclosed and the spring assemblies structured therefrom are economical in the use of wire, provide maximum stability and a firm and balanced yield.

SUMMARY OF THE INVENTION

The bent wire spring units of this invention are structured in three forms for disposition in transversely and longitudinally-spaced relation between a base frame and a grid frame for attachment of their lower ends to the transverse bars of the base frame and attachment of their upper ends to the transverse wires of the grid frame. In one form, the bent wire spring units have an upper attaching element comprising an elongate wire containing at mid-length a rearwardly-extending deviation and at its opposite ends rearwardly-extending diverging arms. A lower attaching element comprises lengths of wire connected at their forward ends to each other and diverging rearwardly therefrom and transversely-spaced supports connecting the rear ends of the diverging arms to the rear ends of the diverging lengths of wire at the lower end. The supports comprise first and second members, said first members comprising first legs connected at their upper ends to the rear ends of the divergent arms of the upper attaching member, extending downwardly and forwardly therefrom toward each other and arms connected at one end to the lower ends of the legs and extending laterally and horizontally therefrom away from each other and said second member comprising second legs connected at their lower ends to the rear ends of the divergent lengths of wire of the lower attaching member extending upwardly therefrom and away from each other and arms S at the upper ends of the second legs extending forwardly and horizontally therefrom. The arms at the lower ends of the first legs and at the upper ends of the second legs are connected to each other.

The bent wire spring units according to the second form have an upper attaching element comprising an elongate wire containing at mid-length a rearwardly-extending deviation and at its opposite ends rearwardly-extending divergent arms, a lower attaching element comprising lengths of wire connected at their forward ends to each other and diverging rearwardly therefrom and transversely-spaced supports connecting the rear ends of the diverging arms to the rear ends of the diverging lengths of wire at the lower end. The supports comprise first and second members, said first members comprising first legs connected at their upper ends to the rear ends of the diverging arms of the upper attaching member extending downwardly and forwardly therefrom away from each other and arms connected at one end to the lower ends of the legs and extending laterally horizontally therefrom toward each other and said second members comprising second legs connected at their lower ends to the rear ends of the divergent lengths of wire of the lower attaching member extending upwardly therefrom and toward each other and arms at their upper ends extending forwardly and horizontally therefrom. The arms at the lower ends of the first legs and the upper ends of the second legs are connected to each other.

The bent wire spring unit according to the third form has an upper attaching element comprising elongate wire containing at mid-length a rearwardly-extending deviation and at its opposite ends rearwardly-extending diverging arms and a lower attaching element comprising lengths of wire connected at their forward ends to each other and diverging rearwardly therefrom and transversely-spaced supports connecting the rear ends of the diverging arms to the rear ends of the diverging lengths of wire at the lower end. The support comprises first and second members, said first member comprising first legs connected at their upper ends to the rear ends of the diverging arms of the upper attaching member extending downwardly and forwardly therefrom and away from each other and arms connected at one end to the lower ends of the legs and extending laterally horizontally therefrom away from each other and said second members comprising legs connected at their lower ends to the rear ends of the diverging lengths of wire of the lower attaching member and extending upwardly and rearwardly therefrom away from each other and arms at the upper ends of the second legs extending forwardly therefrom. The arms at the lower ends of the first leg and at the upper ends of the second legs are connected to each other.

The three forms of bent wire spring units herein illustrated have in common first and second members wherein the legs and arms of the respective members yield in bending relation to each other and the members comprising the legs and arms yield in torsion relative to each other.

The bent wire units are attached at their lower ends to the ends and transverse supports bars of a base frame by staples and at their upper ends to the transverse wires of a grid frame to form spring assemblies and are distributed transversely and longitudinally of the base and grid frames oriented so that in any two adjacent transverse rows when there is an even number of transverse support bars, corresponding sides of the spring units face each other. If there is an odd number of transverse support bars, the spring units are distributed on the support bar at mid-length alternately in oppositely-facing directions. At the corners, the front sides of the spring units face inwardly. There are pairs of transversely-spaced grid wires above each support bars, one of which is attached to the deviation at the upper end of the spring unit and the other of which bears against the rearwardly-diverging arms. If there is an odd number of support bars, there are three transverse grid wires, the center wire being attached to the deviations and the wires at opposite sides thereof bearing upon the divergent arms.

The invention will now be described with reference to the accompanying drawings, wherein.

Figure 1:
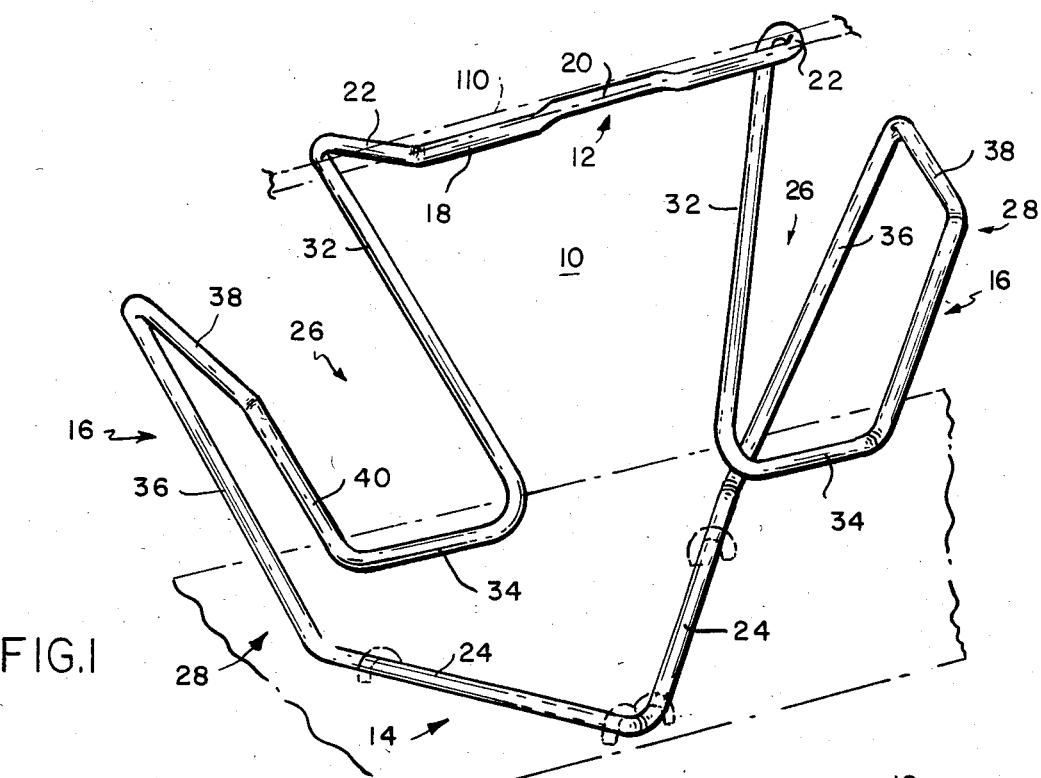
FIG. 1 is a perspective of one form of spring unit of this invention shown attached at its lower end to a base frame and at its upper end to a grid frame.
Figures 2, 3:
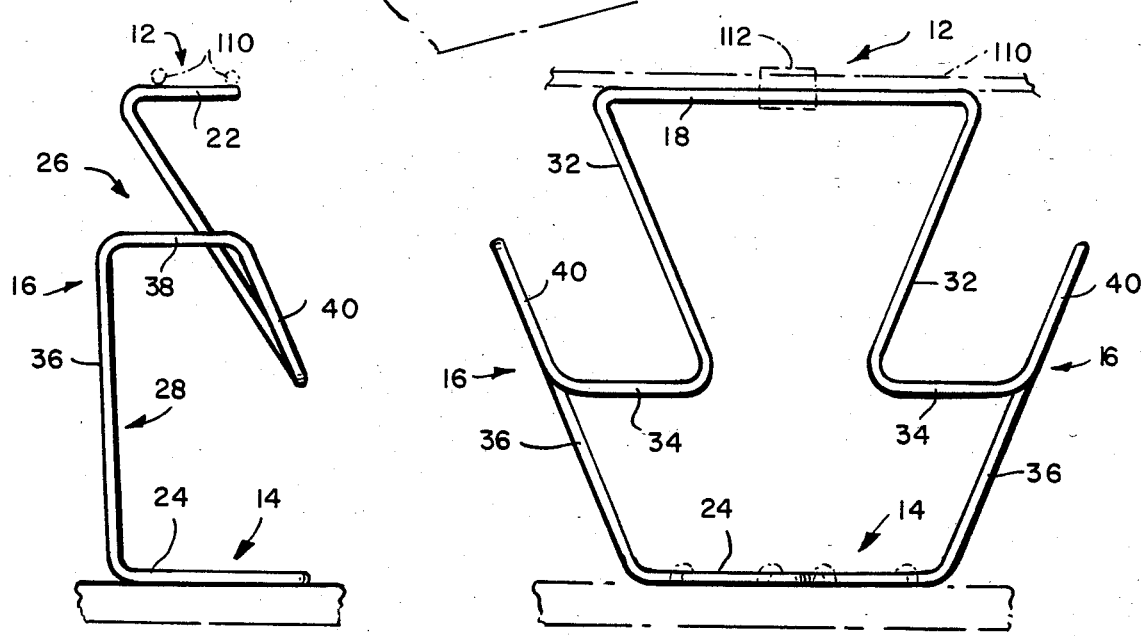
FIG. 2 is an elevation as seen from the front side of FIG. 1.
FIG. 3 is an elevation as seen from the left side of FIG. 2.
Figure 4:
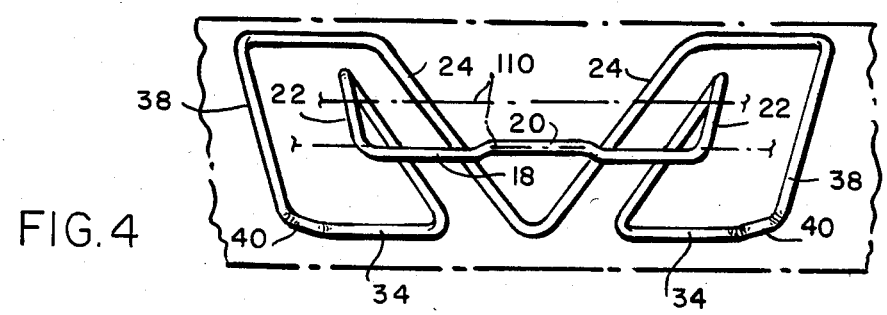
FIG. 4 is a top view of FIG. 2.
Figure 5:
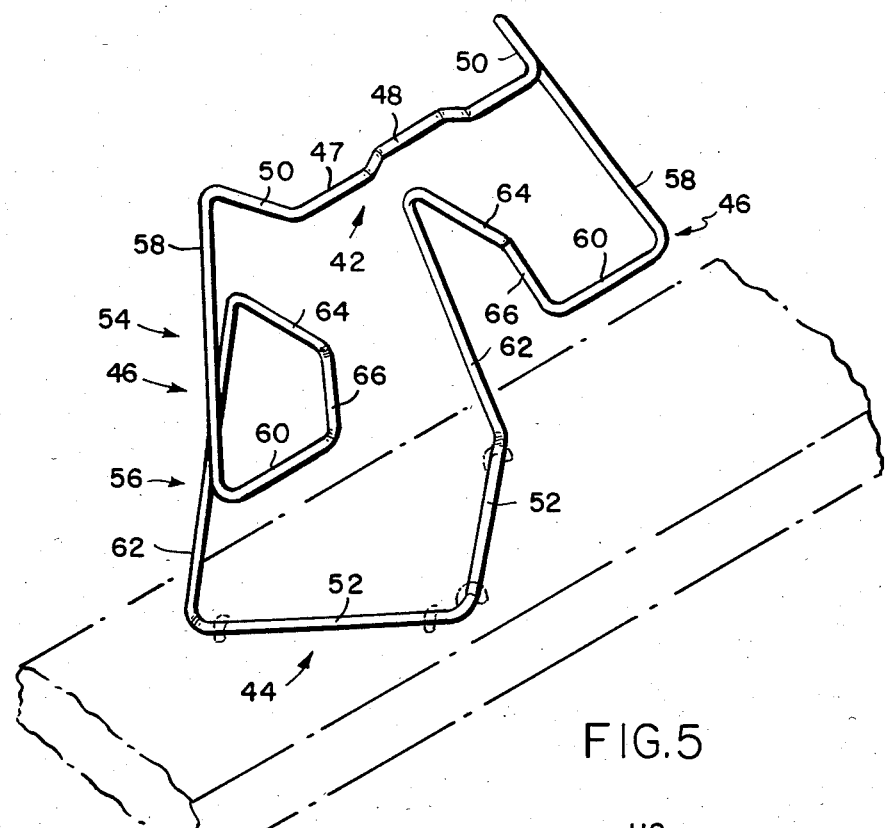
FIG. 5 is a perspective of another form of the spring unit of this invention shown attached at its upper end to a base frame and at its lower end to a grid frame.
Figures 6, 7:
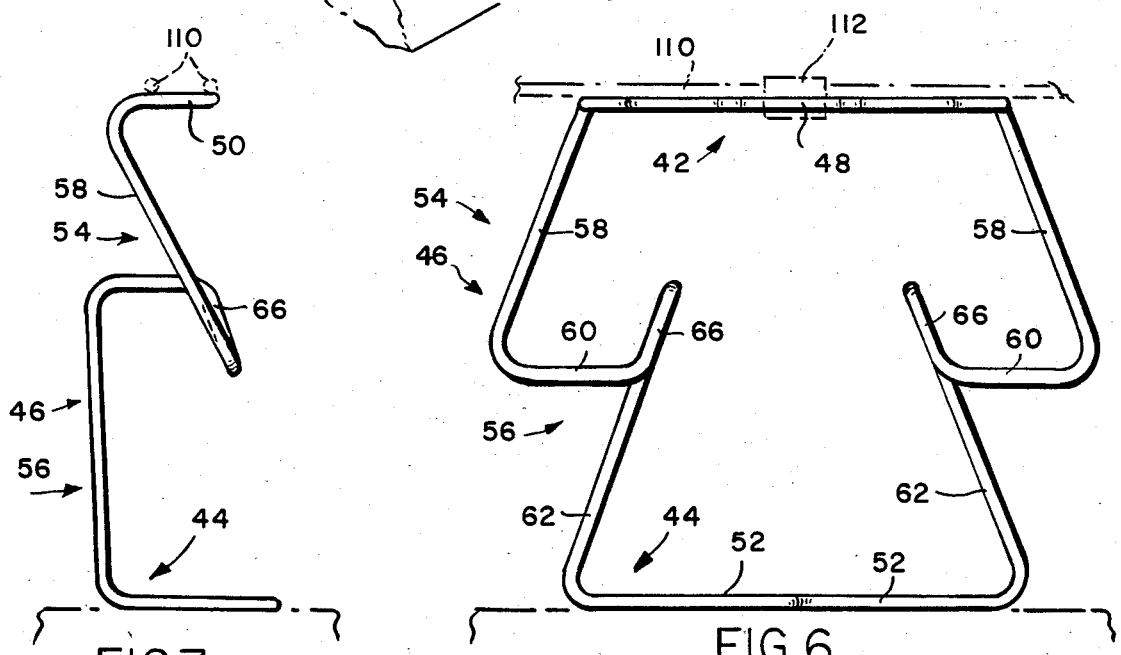
FIG. 6 is an elevation as seen from the front side of FIG. 5.
FIG. 7 is an elevation as seen from the left side of FIG. 6.
Figure 8:
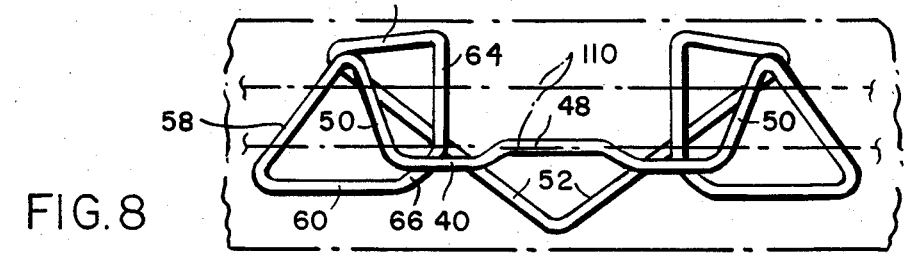
FIG. 8 is a top view of FIG. 6.
Figure 9:
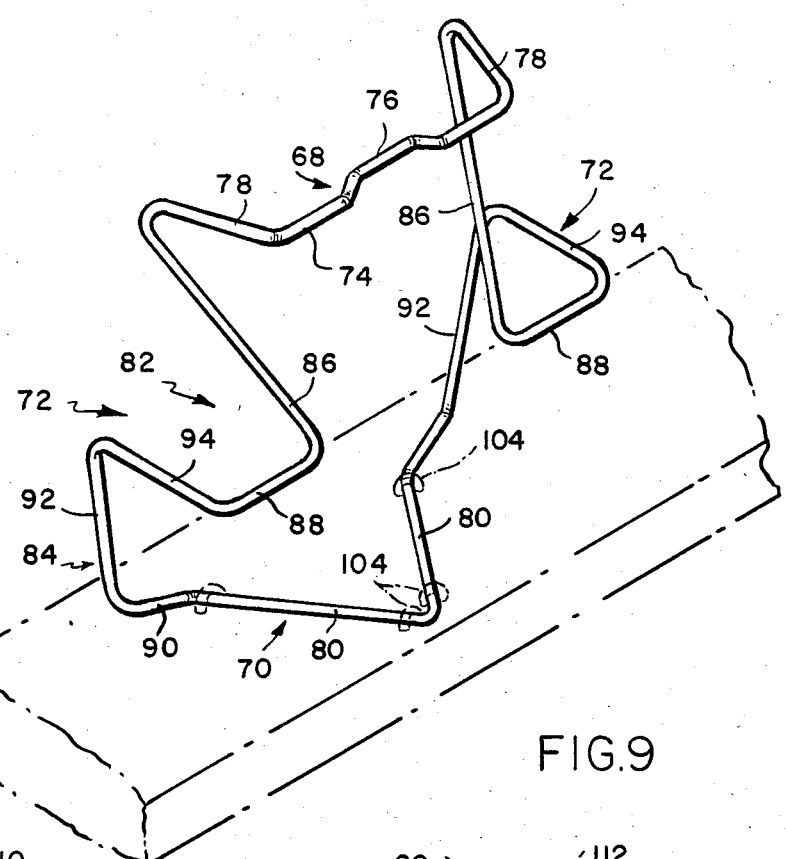
FIG. 9 is a perspective view of another form of the spring unit of this invention shown attached at its lower end to a base frame and at its upper end to a grid frame.
Figures 10, 11:
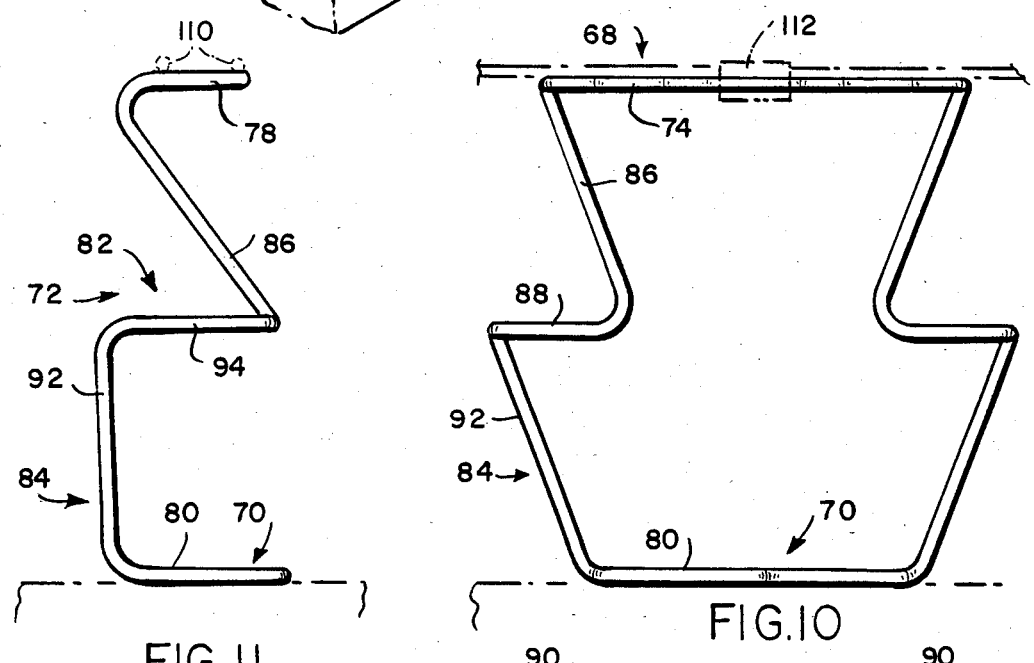
FIG. 10 is an elevation as seen from the front side of FIG. 9.
FIG. 11 is an elevation as seen from the left side of FIG. 10.
Figure 12:
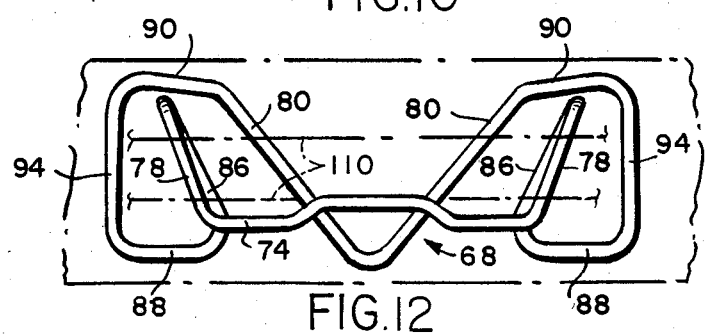
FIG. 12 is a top view of FIG. 10.

Referring to the drawings, FIGS. 1 to 4 inclusive, the bent wire spring units 10 in one form comprise an elongate top member 12, a bottom member 14 and a pair of end supports 16-16. The top member 12 comprises a length of wire 18 containing mid-length thereof a rearwardly-extending deviation 20 and having at its opposite ends rearwardly-extending divergent arms 22-22. The length of wire 18, the deviation 20 and the divergent arms 22-22 are all in the same horizontal plane. The bottom member 14 comprises lengths of wire 24-24 connected at their forward ends, diverging from each other rearwardly and lying in the same plane. The planes of the top and bottom members 12 and 14 are parallel. The end supports 16-16 are symmetrically disposed with respect to the top and bottom members and each comprises a first and second portion 26 and 28. The first portion 26 comprises a leg 32 and an arm 34. The second portion 28 comprises a leg 36 and an arm 38. The legs 32-32 are connected at their upper ends to the rear ends of the arms 22-22 and extend downwardly and forwardly therefrom toward each other and are connected at their lower ends to one end of the arms 34-34. The legs 36-36 are connected at their lower ends to the rear ends of the lengths of wire 24-24 and extend upwardly and rearwardly therefrom away from each other and are connected at their upper ends to one end of the arms 38-38. The arms 34 and 38 are horizontal and are connected at their opposite ends to the lower and upper ends of legs 40-40 which are parallel to the legs 32 and 36 and are inclined rearwardly.

Referring to FIGS. 5 to 8 inclusive, bent wire units in another form comprise an elongate top member 42, a bottom member 44 and a pair of end supports 46-46. The top member 42 comprises a length of wire 47 containing at mid-length a rearwardly-extending deviation 48 and having at its opposite ends rearwardly-extending divergent arms 50-50. The length of wire 47, the deviation 48 and the rearwardly-extending arms 50-50 are all in the same horizontal plane. The bottom member 44 comprises lengths of wire 52-52 connected at their forward ends to each other, diverging from each other rearwardly and lying in the same plane. The planes of the top and bottom members 42 and 44 are parallel. The end supports 46-46 are symmetrically disposed with respect to the top and bottom members and each comprises first and second portions 54 and 56. The first portion 54 comprises a leg 58 and an arm 60. The second portion comprises a leg 62 and an arm 64. The legs 58-58 are connected at their upper ends to the rear ends of the arms 50-50, extend downwardly and forwardly therefrom away from each other and are connected at their lower ends to one end of the arms 60-60. The legs 62-62 are connected at their lower ends to the rear ends of the lengths of wire 52-52, extend upwardly and rearwardly therefrom toward each other and are connected at their upper ends to one end of the arms 64-64. The arms 60 and 64 are horizontal and are connected at their opposite ends to the lower ends of legs 66-66 which are parallel to the legs 52 and 62 and are inclined rearwardly.

Referring to FIGS. 9 to 12, the bent wire units in another form comprise an elongate top member 68, a bottom member 70 and a pair of end supports 72-72. The top member 68 comprises a length of wire 74 containing at mid-length a rearwardly-extending deviation 76 and having at its opposite ends rearwardly-extending diverging arms 78-78. The length of wire 74, the deviation 76 and the diverging arms 78-78 are all in the same horizontal plane. The bottom member 70 comprises lengths of wire 80-80 connected at their forward ends to each other diverging from each other rearwardly and lie in the same plane. The planes of the top and bottom members 68 and 70 are parallel. The end supports 72-72 are symmetrically disposed with respect to the top and bottom members and each comprises a first and second portion 82 and 84. The first portion 82 comprises a leg 86 and an arm 88. The second portion comprises a leg 92 and an arm 94. The legs 86-86 are connected at their upper ends to the rear ends of the arms 78-78, extend downwardly and forwardly therefrom toward each other and are connected at their lower ends to one end of the arms 88-88. The legs 92-92 are connected at their lower ends to the rear ends of the lengths of wire 80-80 by arms 90-90, extend upwardly and rearwardly therefrom away from each other and are connected at their upper ends to one end of the legs 94-94. The arms 88-88 and the arms 94-94 are connected to each other. The legs 86-86 and 92-92 are generally parallel in a transverse plane and rearwardly inclined in a plane at right angles thereto. The arms 78-78, 94-94 and 80-80 are parallel to each other.

The bent wire spring units as described in the several forms illustrated in FIGS. 1 to 12 are positioned transversely and longitudinally between a base frame and a grid frame and attached thereto by fastening the lower ends to the grid frame with staples and the upper ends with crimped sleeves to the grid frame, as will now be described with reference to FIGS. 13 to 17 inclusive.

Figure 13:
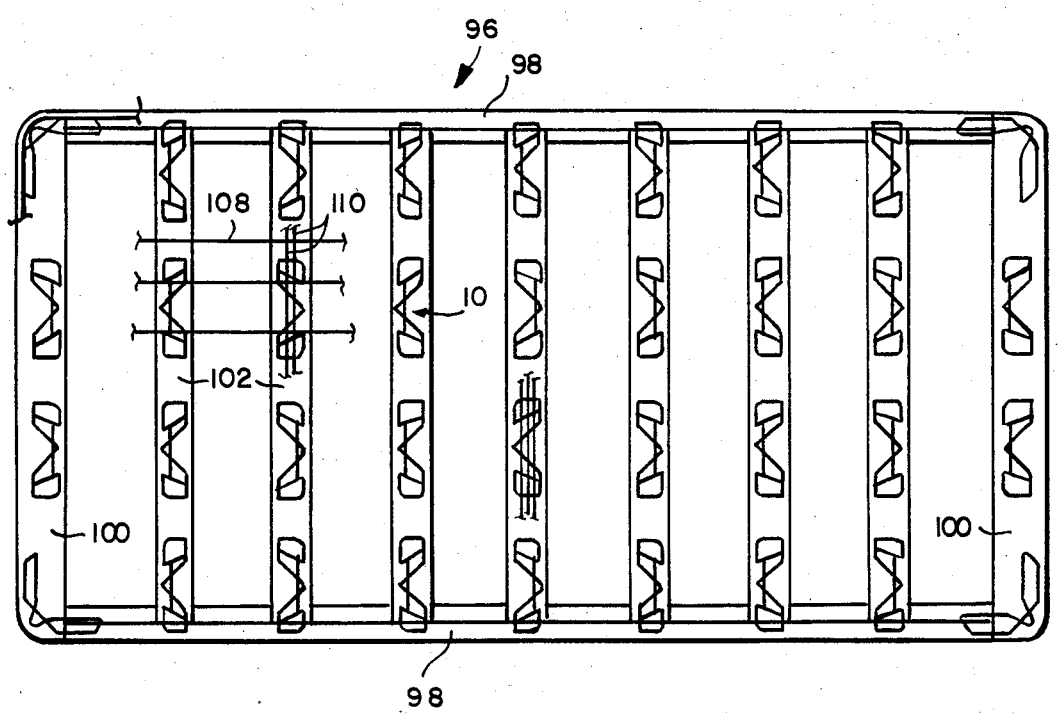
FIG. 13 is a plan view of a grid frame with its spring units disposed thereon showing some of the grid wires forming part of the grid frame.
Figure 14:
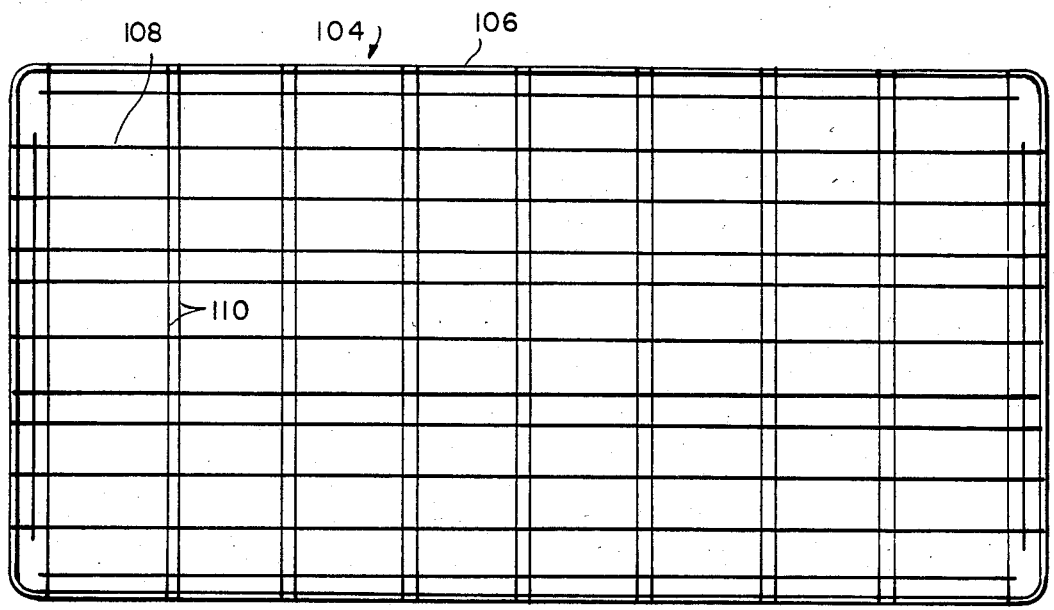
FIG. 14 is a plan view of a grid frame.
Figure 17:
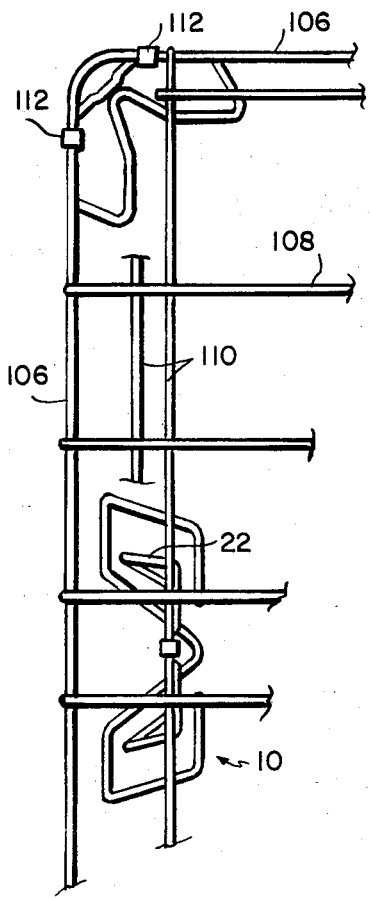
FIG. 17 is a fragmentary view of the disposition of the spring units at the corners and ends of an assembly.

Since all of the bent wire spring units are mounted between the base frame and the grid frame in the same manner, the description of the mounting thereof will be confined to the mounting of the bent wire spring units 10 illustrated in FIGS. 1 to 4. FIG. 13 depicts in plan view a conventional base frame 96 of rectangular configuration comprising spaced, parallel side members 98-98, spaced, parallel end members 100-100 and longitudinally-spaced, parallel, transversely-extending support bars 102. There may be an even number of support bars 102 or an odd number thereof.

Figure 16:
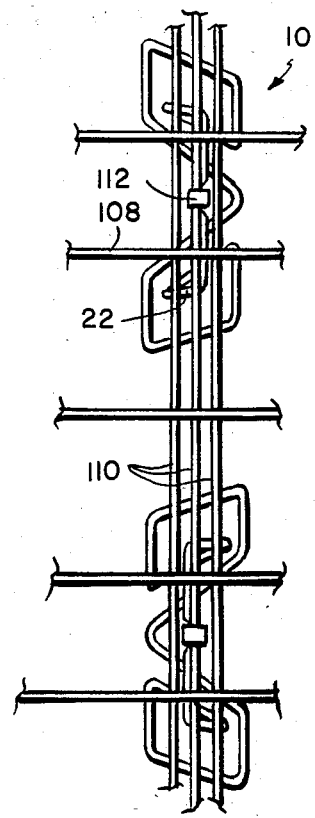
FIG. 16 is a view showing the disposition of the spring units at mid-length of a spring assembly wherein there is an odd number of support bars.
Figure 15:
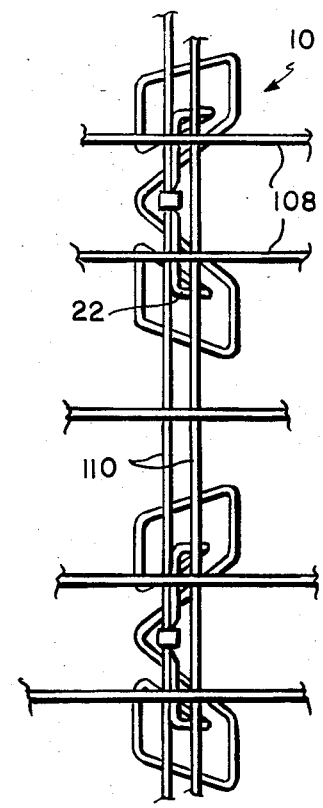
FIG. 15 is an enlarged view of the grid frame showing the attachment of the grid wires to the upper ends of the spring units.

As shown in plan view, the bent wire spring units in their several forms are generally vertically concave/convex and, while transversely symmetrical, are asymmetrical in a plane at right angles thereto. To insure uniform stability throughout the spring assemblies in which they are to be assembled, they are mounted on the adjacent support bars 102 with the concave sides on one support bar facing the concave sides of the spring units on the adjacent support bar. As thus mounted on two adjacent support bars, the convex sides face each other and on the next two adjacent support bars, the concave sides face away from each other. At the ends of the base frame, the spring units are mounted to the ends of the frame with the concave sides facing away from each other. When there is an odd support bar, the spring units are positioned transversely thereof alternately so that adjacent spring units face in opposite directions, FIG. 13. At the corners of the base frame, the spring units are positioned so that the concave sides face inwardly, FIG. 13. All of the spring units are secured at their lower ends to the base frame by staples driven into the ends of the base frame and/or the support bars over the lengths of wire 24-24 at the lower ends of the spring units, FIG. 1. The upper ends of the bent wire spring units are secured to a grid frame 104, FIG. 14, of generally rectangular configuration comprising a border wire 106 and longitudinally and transversely-spaced grid wires 108 and 110 attached at their ends to the border wire and to each other at their crossings. When, as shown herein, there is an odd number of support bars on the base frame, there are pairs of transverse wires 110 above each of the support bars at each side of the center support bar, FIG. 15, and three wires 110 above the center support bar, FIG. 16. There are also pairs of wires 110 above the end members 100, FIG. 17. As shown in FIG. 15, the pairs of wires 110 are so spaced as to bear upon the divergent arms 22-22 at the upper ends of the spring units. The forward one of the wires 110 with respect to the upper ends of the spring units is attached to the deviation 20 by a clip 112. The rear one of the wires 110 merely bears against the upper end of the spring unit and stabilizes the unit so that it does not tilt because of its asymmetrical configuration. In FIG. 16 wherein the units are reversed relative to each other, the deviations are attached to the center one of the wires 110. At the corners, FIG. 17, the divergent arms 22-22 are attached to the border wire by clips 112-112.

The bent wire spring units illustrated in the several forms described above embody in common yield to pressure applied to the upper ends thereof which is resisted by a combination of bending and torsion of the component parts of the spring units, the consequence of which is uniform yield throughout the length and breadth of the spring assembly in which they are incorporated to provide for firm and uniform yield throughout the length and breadth of the spring assembly.

It should be understood that the present disclosure is for the purpose of illustration only and includes all modifications or improvements which fall within the scope of the appended claims.

What is claimed is:

1. A bent wire spring unit for interposition between a rigid base frame and a grid frame for attachment thereto comprising upper and lower attaching members and a pair of end members, said end members being transversely symmetrical from side to side and asymmetrical from front to back, comprising upper legs extending downwardly and forwardly from the upper attaching member and toward each other, arms connected at one end to the lower ends of the upper legs, lower extending upwardly and rearwardly from the lower attaching member and away from each other, arms connected at one end to the upper ends of the lower legs and means connecting the other ends of the arms of the respective end members to each other, said upper and lower legs being parallel to each other and said arms being parallel and at right angles to each other.

2. A bent wire spring unit for interposition between a rigid base frame and a grid frame for attachment thereto comprising upper and lower attaching members and a pair of end members, said upper attaching member comprising a length of wire containing mid-length thereof a rearwardly-extending deviation and at its opposite ends rearwardly-extending diverging arms and said end members being transversely symmetrical from side to side and asymmetrical from front to back and comprising upper legs attached at their upper ends to the rear ends of the diverging arms and extending downwardly from the upper attaching member, arms connected at one end to the lower ends of the upper legs, lower legs extending upwardly from the lower attaching element, arms connected at one end to the upper ends of said lower legs and means connecting the other ends of the arms of the respective end members to each other.

3. A bent wire spring unit for interposition between a rigid base frame and a grid frame for attachment thereto comprising upper and lower attaching members and a pair of end members, said end members being transversely symmetrical from side to side and asymmetrical from front to back and comprising upper legs extending downwardly from the upper attaching member, arms connected at one end to the lower ends of the upper legs, lower legs extending upwardly from the lower attaching member, said lower attaching member comprising two lengths of wire connected at their forward ends to each other and diverging rearwardly therefrom, said lower legs being connected at their lower legs to the rear ends of the diverging lengths of wire, arms connected at one end to the upper ends of the lower legs and means connecting the other ends of the arms of the respective end members to each other.

4. A bent wire spring unit for interposition between a rigid base and a grid frame for attachment thereto comprising upper and lower attaching members and a pair of end members, said end members being transversely symmetrical from side to side and asymmetrical from front to back and comprising upper legs extending downwardly and forwardly relative to the upper attaching member and away from each other, arms connected at one end to the lower ends of the upper legs, lower legs extending upwardly and rearwardly relative to the lower attaching member and toward each other, arms connected at one end to the lower ends of the upper legs and to the upper ends of the lower legs, said upper and lower legs being transversely-spaced and parallel and said arms being vertically-spaced and parallel and at right angles to each other, and means connecting the other ends of the arms of the respective ends members to each other.

5. A bent wire spring unit according to claim 4 wherein the upper attaching member comprises a length of wire containing at mid-length a rearwardly-extending deviation and at its opposite ends rearwardly-extending diverging arms and wherein the upper ends of the upper legs are attached to the rear ends of the diverging arms.

6. A bent wire spring unit according to claim 4 wherein the lower attaching members comprise two lengths of wire connected at their forward ends to each other and diverging rearwardly therefrom and wherein the lower ends of the lower legs are connected to the rear ends of the diverging lengths of wire.

7. A bent wire spring unit for interposition between a rigid base frame and a grid frame for attachment thereto comprising upper and lower attaching members and a pair of end members, said end members being transversely symmetrical from side to side and asymmetrical from front to back and comprising upper legs extending downwardly from the upper attaching member and toward each other, arms connected at one end to the lower ends of the upper legs, lower legs extending upwardly from the lower attaching member and away from each other, arms connected at one end to the lower ends of the upper legs, lower legs extending upwardly and rearwardly from the lower attaching member and away from each other, arms connected at one end to the upper ends of the lower legs and means connecting the other ends of the arms of the respective end members to each other, said upper and lower legs being parallel and said arms being at right angles to each other.

8. A bent wire spring unit according to claim 7 wherein the upper attaching elements comprise a length of wire containing mid-length thereof a rearwardly-extending deviation and at its ends rearwardly-extending diverging arms and the upper ends of the upper legs are attached to the rear ends of the diverging arms.

9. A bent wire spring unit according to claim 7 wherein the lower attaching member comprises two lengths of wire connected at their forward ends to each other and diverging rearwardly therefrom and wherein the lower ends of the lower legs are connected to the rear ends of the diverging lengths of wire.

10. A spring assembly comprising a rectangular base frame having spaced, parallel sides and ends and an even number of longitudinally-spaced, parallel, transverse support bars positioned at equal spaces between the ends, a grid frame embodying a border wire of rectangular configuration defining spaced, parallel sides and ends and spaced, parallel longitudinally and transversely-positioned crossing wires secured at their ends to the border wire and at their intersections to each other and a plurality of bent wire spring units yieldable in bending and torsion secured at their lower and upper ends to the base frame and to the wires of the grid frame, said spring unit being transversely symmetrical from side to side and asymmetrical from front to back and being positioned on the base frame in transversely-spaced relation with the front sides and back sides on any two adjacent bars facing each other and said upper ends of the spring units comprising a length of wire containing mid-length thereof a rearwardly-extending deviation and at its opposite end rearwardly-extending diverging arms and wherein pairs of transverse wires are engage with the rearwardly-diverging arms and there is means connecting one of said transverse wires to the deviations.

11. A spring assembly according to claim 10 wherein there is an odd number of support bars and the spring units are distributed on the support bar at mid-length with adjacent spring units facing in opposite directions.

12. A spring assembly according to claim 11 wherein there are three transverse wires at mid length and means connecting the deviations of the oppositely-facing spring units to the mid one of the three transverse wires.

* * * * *